No. 794,753. PATENTED JULY 18, 1905.
R. O. STETSON.
ILLUMINATED SPIRIT LEVEL.
APPLICATION FILED DEC. 27, 1902.
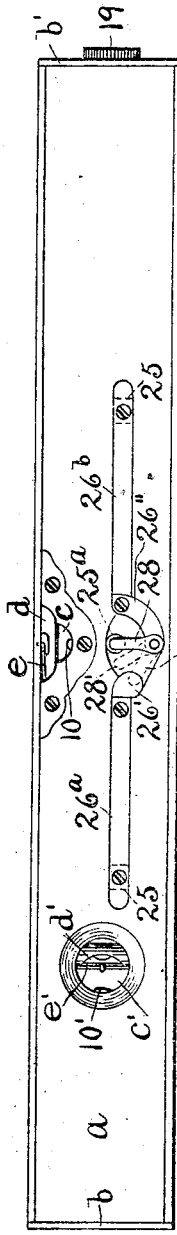
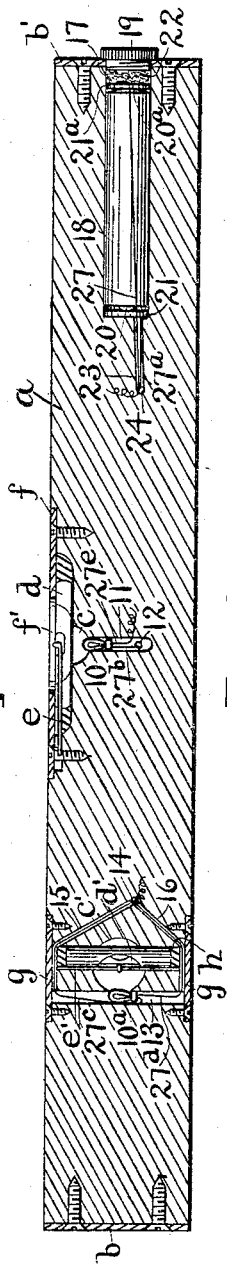
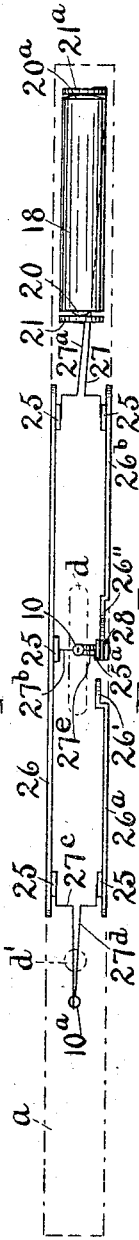
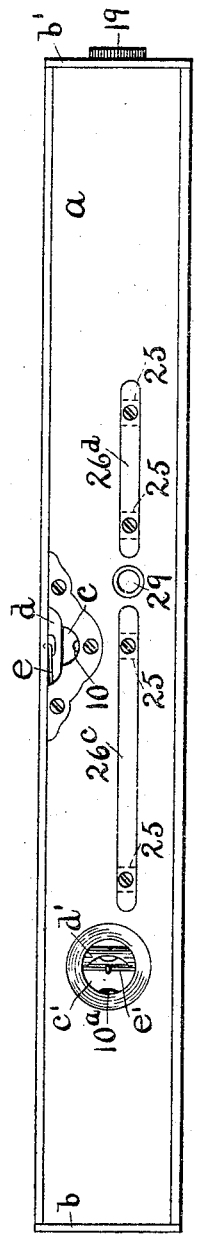
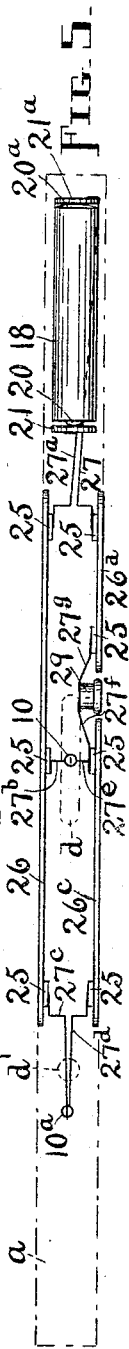
Witnesses
A. L. Stevens.
F. A. Cutter.
Inventor
Raymond O. Stetson
By Webster, Taft & Tilley
Attorneys No. 794,753. Patented July 18, 1905.

UNITED STATES PATENT OFFICE.

RAYMOND O. STETSON, OF GREENFIELD, MASSACHUSETTS.

ILLUMINATED SPIRIT-LEVEL.

SPECIFICATION forming part of Letters Patent No. 794,753, dated July 18, 1905.

Application filed December 27, 1902. Serial No. 136,826.

*To all whom it may concern:*

Be it known that I, RAYMOND O. STETSON, a citizen of the United States, residing at Greenfield, in the county of Franklin and Commonwealth of Massachusetts, have invented a new and useful Illuminated Spirit-Level, of which the following is a specification.

My invention relates to improvements in spirit-levels in which electric-lighting means adapted to illuminate the glasses is employed, as hereinafter described and claimed; and the objects of my improvement are, first, to afford means for lighting up a level or plumb glass in spirit-levels at such times as it is difficult to see the bubble, especially at night or in dark places; second, to equip a spirit-level having both level and plumb glasses with an appliance for illuminating either of said glasses at will; third, to equip such a level with an appliance for illuminating both glasses simultaneously, and, fourth, to provide a practicable and efficient spirit-level embodying my invention. I attain these objects by the means illustrated in the accompanying drawings, in which—

Figure 1 is a side view of a spirit-level equipped with the illuminating devices, showing a switch for directing the electric current through either lamp; Fig. 2, a longitudinal vertical section through the level, serving to illustrate the construction regardless of the means employed for opening and closing the circuits; Fig. 3, a plan of the switch-circuits; Fig. 4, a side view of a level, showing a push-button in place of a switch; and Fig. 5, a plan of the push-button circuits.

Similar letters and figures designate similar parts throughout the several views.

Usually spirit-levels are provided with both a level and a plumb glass, and such a level I have shown and will describe; but it is to be understood that my invention may be used in a level having only one glass or in connection with a single glass in a level having more than one. It is clear, too, that the invention is adaptable to a level having more than two glasses to be illuminated thereby.

A practical arrangement for wiring and making up the circuits is set forth; but numerous departures from the exact method shown will readily occur to one skilled in the art and will be required in the manufacture of different sizes and styles of levels.

In the drawings a level is shown consisting of a wooden frame or bar $a$, suitably bound in metallic trimmings, in part comprising end plates $b$ and $b'$, having the usual sight-openings $c$ and $c'$ and provided with a level-glass $d$, traversing the opening $c$ in a horizontal direction, and a plumb-glass $d'$, traversing the opening $c'$ in a vertical direction. These glasses are partly filled with fluid and mounted in the bar $a$ in the ordinary and well-known manner. Markers $e$ and $e'$ are associated with the fluid-glasses $d$ and $d'$, respectively. A plate $f$ in the upper edge of the bar $a$ over the glass $d$ has a slot $f'$ therein, so that said glass can be seen from above. The parts thus far described are not in general materially or essentially different from levels to be found anywhere upon the market.

An incandescent electric lamp 10 is located below the level-glass $d$ in the base of the sight-opening $c$, the top of said lamp protruding into said opening and the rest of the lamp extending into a vertical channel 11, directed downward into the bar $a$ from the center of the sight-opening. A transverse passage 12 for wires opens at the center into the passage 11 and at the ends through the sides of the bar. A second incandescent lamp $10^a$ is located at the left of the plumb-glass $d'$, said lamp being placed in a vertical channel 13, which opens centrally at one side into the sight-openings $c'$, adjacent said glass and through the top and bottom edges of the bar. The side of the lamp $10^a$ protrudes into the sight-opening $c'$. Any suitable means, as plaster-of-paris, may be employed to hold the lamps in position in their respective channels. The upper and under edge plates $g$ $g$, which are used to cover the ends of the plumb-glass channel $h$, also extend over the ends of the lamp-channel 13.

A passage 14 for wires extends through the bar $a$ from side to side at the right of the sight-opening $c'$, and oblique passages 15 and 16 for wires extend from depressions in said bar inside of the top and bottom plates $g$ to said passage 14.

In the right-hand terminal of the bar $a$, a chamber 17 is formed to receive a dry battery 18, consisting of one or more cells, said chamber opening through the end plate $b'$, the hole in which is screw-threaded to accommodate a cap 19. One pole 20 of the battery 18 is in contact with a plate 21 at the inner end of the chamber 17 and the other pole $20^a$ is in contact with a second plate $21^a$, which is pressed against said pole $20^a$ when the cap 19 is screwed into place by means of a wad of paper 22 or other suitable elastic or yielding non-conducting material or filling interposed between said plate $21^a$ and said cap. A passage 23 for wires extends longitudinally in the bar from the inner end of the chamber 17 a short distance to a point, when it opens into a cross-passage 24 for wires opening through the sides of said bar.

To renew or replace the battery 18 after becoming exhausted, unscrew and remove the cap 19, take out the filling 22, turn the plate $21^a$, which has a wire attached to it, as hereinafter explained, to one side, and abstract the old battery, the plate 21, which also has a wire permanently attached thereto, remaining undisturbed, then insert the new battery, press the plate $21^a$ into place again, reinsert the filling, and replace the cap. The chamber 17 should be large enough, especially at the outer end, to enable the plate $21^a$ to be manipulated, but not so large as a whole as to permit the battery to rattle about, in which event it would be necessary to stuff something between said battery and the walls of said chamber.

The sides of the bar $a$ are recessed and grooved to receive circuit-forming metallic plates 25 and metallic connecting-strips. Five plates 25 are used in connection with the switch and seven with the push-button. In the first instance a plate is located adjacent or over the open end of each of the passages 14, 12, and 24 at the back and adjacent the open end of each of the passages 14 and 24 at the front, and in the second instance a plate is placed adjacent or over each end of each of said passages. The back plates 25 in each case are connected by a strip 26, affixed to the side of the bar $a$ over said plates. A wire 27 extends from the plate $21^a$ through the chamber 17 and passages 23 and 24 to the right-hand front plate 25, and a wire $27^a$ extends from the plate 21 through the passages 23 and 24 to the right-hand rear plate 25, the wires being securely fastened to the plates in all cases. One wire $27^b$ from the lamp 10 runs through the channel 11 and passage 12 to the middle rear plate 25. A wire $27^c$ runs from the lamp $10^a$ upward through the channel 13, under the upper plate $g$, downward through the passage 15, and outward through the passage 14 to the left-hand rear plate 25, and a second wire $27^d$ extends downward in said channel from said lamp to pass above the bottom plate $g$, upward in the passage 16 to the passage 14, and through the same to the left-hand front plate 25. With the switch a contact-piece $25^a$ is screwed into or otherwise attached to the bar $a$ in place of the middle front plate 25 used in connection with the push-button, and the other wire $27^e$ from the lamp 10 extends through the channel 11 and passage 12 to said contact-piece, to which it is fastened. This wire connects in a similar manner with the middle front plate 25 when the push-button is employed.

Referring next to Figs. 1 and 3, a metallic strip $26^a$ is secured by screws or otherwise to the front of the bar $a$ at the left and has one end in contact with the left-hand front plate 25 and the other end offset at $26'$, for the purpose presently to be explained. A metallic strip $26^b$ is similarly secured to the front of the bar at the right and has one end in contact with the right-hand front plate 25, while the opposite terminal $26''$ curves downward beneath the contact-piece $25^a$. The terminal $26''$ is offset or set back from the face of the strip $26^b$, like the terminal $26'$ of the strip $26^a$, and the base of a metallic switch-strap 28 is pivoted to said terminal $26''$. The arc, which may be described by the free end of the strap 28 when swung upon its pivot, includes both the terminal $26'$, which will be hereinafter termed the "contact-terminal" of the strip $26^a$, and the contact-piece $25^a$. The contact-terminal $26'$ and the terminal $26''$ are offset, as noted, for the purpose of keeping the face of the strap 28 flush with the surface of the bar which surrounds the portion cut away at this place to permit whatever movement of said strap is necessary. The strap should be of such material and so mounted as to have a good rubbing contact with either the contact-terminal or contact-piece when brought into engagement therewith. The aforesaid contact-terminal and contact-piece are separated by a sufficient distance to enable the switch-strap to rest between them without touching either.

In operation, assuming that the switch-strap 28 stands between the contact-terminal $26'$ and the contact-piece $25^a$ in the position indicated by the dotted lines $28'$ in Fig. 1 and it is desired to illuminate the glass $d$, throw said strap to the right onto the contact-piece $25^a$, as shown by full lines in Figs. 1 and 3. This action completes the circuit from and to the battery 18 through the lamp 10, which is thus lighted, said circuit being made up of the plate 21, wire $27^a$, left-hand rear plate 25, strip 26, wires $27^b$ and $27^e$, contact-piece $25^a$, strap 28, strip $26^b$, right-hand front plate 25, wire 27, and plate $21^a$. The strap 28 may be moved from the contact-piece $25^a$ in either direction to break the circuit and extinguish the light, but generally should be turned to the left, as it does not then have to cross said contact-piece in order to engage the contact-terminal $26'$. To light the lamp $10^a$ and illuminate the glass $d'$, move the switch-strap into contact with the contact-terminal 26', as indicated by the dotted lines 28'' in Fig. 1. The circuit through the lamp $10^a$ is now closed, such circuit consisting of the plate 21, wire $27^a$, right-hand rear plate 25, strip 26, left-hand rear plate 25, wires $27^c$ and $27^d$, left-hand front plate 25, strip $26^a$, strap 28, strip $26^b$, right-hand front plate 25, wire 27, and plate $21^a$. When the switch-strap is moved off the contact-terminal 26', the light in the lamp $10^a$ is extinguished. For a reason similar to that already given the switch-strap should be moved from the contact-terminal to the right.

In the push-button construction a plate 25 is located at the right of the middle front plate 25, in addition to the hereinbefore-mentioned plates at the ends of the wire-passages. The two front plates 25 at the left are connected by a strip $26^e$ and the two at the right by a strip $26^d$. Between adjacent ends of the strips $26^e$ and $26^d$, but not touching the same, is an ordinary push-button 29, which is let into the front side of the bar $a$. Suitable oblique passages are formed in the bar for the wires $27^f$ and $27^g$, the former extending between the push-button and the plate 25 immediately at the left and the latter extending between said push-button and the plate 25 immediately at the right. Now when the push-button is operated both lamps 10 and $10^a$ are lighted and illuminate the level and plumb glasses, the lamp-circuits, consisting of the several wires, plates, strips, &c., already fully described, being then closed, and when said push-button is released the circuits are broken and both lamps at once extinguished.

The wiring is thought to be simplified by the use of plates and connecting surface-strips; but it is very evident that such members may be omitted and wires substituted, strips being then employed only for the purpose of covering the grooves or channels in which such wires run.

In case a metal frame is used instead of a wooden bar the circuit-forming members would necessarily have to be properly insulated, as will be readily understood.

I seek to cover, broadly, the application of electric lights to levels and to include various changes in construction, such as those which may affect the position and arrangement of the lamps and the kind and arrangement of the switch and push-button, as well as such modifications as have already been pointed out, so long as the same do not depart from the nature of my invention.

What I claim as my invention, and desire to secure by Letters Patent, is—

1. As a new article of manufacture, a portable spirit-level comprising a level-bar, a fluid-glass arranged therein and exposed through one side of the bar, a battery mounted within the level-bar, an electric lamp arranged within the bar contiguous to the glass for illuminating the same and in circuit with the battery, and a switch located in said circuit, substantially as described.

2. As a new article of manufacture, a portable spirit-level comprising a conventional parallelogrammatic level-bar, a fluid-glass arranged within the faces of the bar and exposed through one of the same, said bar having a battery-recess leading into the body of the same from one of the faces thereof, a battery removably mounted in said recess, an electric lamp associated with the level-glass, and an electric circuit including said lamp and battery, substantially as described.

3. As a new article of manufacture, a portable spirit-level comprising a bar, a level-glass extending substantially longitudinally thereof, an electric lamp associated therewith, a second glass arranged transversely of the bar and located adjacent one end of the same, a battery mounted within the opposite end of the bar, an electric lamp associated with the second glass, and a circuit including said lamps and battery, substantially as described.

4. As a new article of manufacture, a portable spirit-level comprising a bar, a level-glass extending substantially longitudinally thereof, an electric lamp associated therewith, a second glass arranged transversely of the bar and located adjacent one end of the same, said bar having a battery-recess extending into the same longitudinally thereof from its opposite end, a battery removably mounted in the recess, a lamp associated with the second glass, and a circuit including said lamps and battery, substantially as described.

5. As a new article of manufacture, a leveling instrument comprising a bar having a fluid-glass recess therein and a battery-recess, a fluid-glass mounted in its recess, an electric lamp located adjacent said glass for illuminating the same, a battery in the battery-recess, a circuit-closing device mounted on the bar, and circuit connections from the battery to the lamp including said circuit-closing device, substantially as described.

6. A leveling instrument comprising a body having therein a recess for a level-glass, and a battery-recess, a level-glass mounted in its recess, an electric incandescent lamp arranged therebeneath, a battery in the battery-recess, a circuit-closing device mounted on the body, and circuit connections from the battery to the lamp including said circuit-closing device.

7. A spirit-level comprising two bulb-tubes, a source of electricity in the body of the level, electric lamps adjacent to the bulb-tubes, and means for closing the circuit between the source of electricity and either one of said lamps independently one of the other.

8. As an article of manufacture, a leveling instrument comprising a body having therein a recess for a level-glass and a battery-recess, a level-glass maintained in its recess, an electric incandescent lamp arranged within the body contiguous to the glass for illuminating the latter, a battery in the battery-recess, a circuit-closing device mounted on the body, and circuit connections from the battery to the lamp, including said circuit-closing device, substantially as described.

In testimony whereof I have signed my name to this specification in the presence of two subscribing witnesses.

RAYMOND O. STETSON.

Witnesses:
   EDWIN A. STRATTON,
   FORREST S. STETSON.